J. L. HOWARD.
BUSINESS FORM.
APPLICATION FILED MAR. 14, 1921.

1,406,561.  Patented Feb. 14, 1922.

The Travelers Insurance Company
Hartford, Connecticut

CERTIFICATE No._____

A  Hereby Agrees to Issue Life Insurance to

*John Doe* for the largest sum stated on any coupon remaining hereto attached, provided he will sign the attached application and pay to the agent hereinafter named the premium for the form and amount of insurance selected according to the premium rates set forth in the rate book of the Company.

The Company hereby authorizes____*Richard Rowe*____, Agent, to place this insurance in force immediately upon payment of the premium so determined.

_____
Department Secretary.

Received of the applicant herein named the _____ annual premium of ($) _____
_____ Dollars
upon the _____ form of contract,
payable to _____ as beneficiary.
Insurance in the amount selected as hereinbefore described shall be in force from the date of such payment as certified hereon for the period covered by such premium; subsequent payments to be made according to the terms of said contract.

CERTIFIED: DATE _____    _____ AGENT    Department Secretary

VOID UNLESS CERTIFIED BY THE AGENT HEREIN NAMED WITHIN SIXTY DAYS FROM _____

INSTRUCTIONS: If not certified within that period return this certificate immediately thereafter to the Company for cancelation.
If certified tear straight across on perforated line below coupon which shows in left hand column the amount of insurance selected. Deliver upper portion to Insured. Return lower portion to Company for issuance of contract.

| | | |
|---|---|---|
| ONE THOUSAND DOLLARS | COUPON No. 1 | |
| TWO THOUSAND DOLLARS | COUPON No. 2 | ONE THOUSAND DOLLARS |
| TWENTY-FIVE HUNDRED DOLLARS | COUPON No. 2½ | TWO THOUSAND DOLLARS |
| THREE THOUSAND DOLLARS | COUPON No. 3 | TWENTY-FIVE HUNDRED DOLLARS |
| FOUR THOUSAND DOLLARS | COUPON No. 4. | THREE THOUSAND DOLLARS |
| FIVE THOUSAND DOLLARS | COUPON No. 5 | FOUR THOUSAND DOLLARS |
| SIX THOUSAND DOLLARS | COUPON No. 6 | FIVE THOUSAND DOLLARS |
| SEVEN THOUSAND DOLLARS | COUPON No. 7 | SIX THOUSAND DOLLARS |
| SEVENTY-FIVE HUNDRED DOLLARS | COUPON No. 7½ | SEVEN THOUSAND DOLLARS |
| EIGHT THOUSAND DOLLARS | COUPON No. 8 | SEVENTY-FIVE HUNDRED DOLLARS |
| NINE THOUSAND DOLLARS | COUPON No. 9 | EIGHT THOUSAND DOLLARS |
| TEN THOUSAND DOLLARS | COUPON No. 10 | NINE THOUSAND DOLLARS |
| | COUPON No. 11 | TEN THOUSAND DOLLARS |

NUMBER _____

I hereby apply to The Travelers Insurance Company for Life Insurance for the smallest amount stated on any coupon remaining hereto attached, pursuant to the terms and conditions of an application for life Insurance in accordance with which there has been Issued to me Life Contract No. _____

I certify that since making such application I have not received medical or surgical attention, and that there has been no change in my personal or family history.

_____ form of contract
C  I desire _____ as beneficiary.
payable to _____
_____ Agent
I further declare that I have paid to _____
_____ Dollars
the _____ annual premium of ($_____)
and that I hold the certificate bearing the number imprinted in red ink hereon.
_____ Applicant.

Witness _____

Date _____  VOID UNLESS EXECUTED WITHIN SIXTY DAYS FROM _____

Inventor.
James L. Howard
by A. E. Hart
his Attorney.

UNITED STATES PATENT OFFICE.

JAMES L. HOWARD, OF HARTFORD, CONNECTICUT, ASSIGNOR TO THE TRAVELERS INSURANCE COMPANY, OF HARTFORD, CONNECTICUT, A CORPORATION OF CONNECTICUT.

BUSINESS FORM.

1,406,561. Specification of Letters Patent. Patented Feb. 14, 1922.

Application filed March 14, 1921. Serial No. 452,018.

*To all whom it may concern:*

Be it known that I, JAMES L. HOWARD, a citizen of the United States, and resident of Hartford, county of Hartford, State of Connecticut, have invented certain new and useful Improvements in a Business Form, of which the following is a specification.

This invention relates to a novel and useful form for transacting business. The invention finds a peculiar usefulness in connection with the insurance business and for purposes of the disclosure in this application of the invention and its method of use, the description will be directed to an insurance form, such as is illustrated in the drawing, and in which the invention is embodied.

In the solicitation and sale of life insurance at the present time, and assuming that an agent has sold a policy of insurance to an applicant for insurance, it is a customary practice for the agent to request the issuing company to prepare a second policy which usually is identical with the policy which has been sold as to the amount, premium, form of contract and beneficiary. Upon delivery of the original policy, the agent offers to the insured this additional policy and the insured is given a period of sixty days within which to decide whether or not he will accept the additional policy. In a certain percentage of cases, such policies are accepted, but in a very large percentage of cases such policies are not accepted because the insured may desire a different form or amount which, without the use of the proposed certificate, the agent is not able to grant without submission to the executives of the company. The time consumed in preparing these extra policies which are not used is an item of considerable moment, and the insurance form constituting the subject matter of this invention is intended to largely reduce or eliminate the waste involved; while, at the same time, giving to the agent and to the insured an opportunity to make such a contract as may then be agreed upon without being restricted to any particular form or amount.

Generally speaking, the insurance form constituting the subject matter of this invention as sent to the agent by the issuing company constitutes an authorization by the company, through the signature of a proper official, of the agent specified, to close a contract of insurance with the insured, who is specified, for any amount of insurance between limits established by the company on the form. The agent is thus left free to negotiate the sale of any of the different forms of policies issued by the company and the insured is left free to select the form desired, to specify how much additional insurance he wishes to purchase, and to indicate who shall be the beneficiary, and in all of these respects the policy of additional insurance may vary from the original policy upon which this additional insurance is based.

This invention then resides in an insurance form of peculiar construction and arrangement comprising three sections embodied in a single sheet which shall be severable in one—the intermediate-section, and so arranged that each section shall constitute a check on the other section as to at least one condition of the policy to be issued, for instance the amount of the policy, this check being automatically established by the severance of the form. The two parts of the form when severed will each carry corresponding indications as to the form of insurance contract which is desired, the amount of the premium, and the beneficiary, (some or all of these features of the insurance contract may be endorsed on the two parts of the form). Before proceeding to a detailed description of the particular form here selected for purposes of illustration, it may be said that the device forming the subject matter of this invention may be adapted to other uses than in the field of insurance and that the automatic check on the two parts of the device when severed may be a check on other things than the amount of the insurance policy involved, and further, that this automatic check may be applied to more than a single feature of the transaction, which in the case illustrated is the sale of insurance.

The drawing illustrates the application of the invention to a form which may be utilized in connection with the sale of an insurance policy. As will be seen, the form is in three sections which may be generally indicated by the reference letters A, B and C. The upper section is the agreement by the company to issue insurance to the insured, John Doe, and authorizes the agent, Richard Rowe, to place the insurance in force under certain conditions with blanks left for the indication of the amount of the premium, the amount of insurance, the form of the contract, and the beneficiary. A blank is also left for the certification by the agent which will put the insurance in force as and of the date written. This upper section contains, as in the upper right hand corner, a certain certificate number.

The intermediate section B comprises a plurality of coupons with perforations between in order that the complete form may be readily severed at any desired point. The borders D are not perforated and thus guard against accidental severance of the form or any part of it. In the case illustrated, these coupons have a central column in which each coupon is numbered, and at each side of this central column there is a column representing in the case illustrated, dollars. It will be observed that in the left hand column of coupon No. 1 there is an indication of $1,000, but that in the right hand column of coupon No. 1 there is no indication of any amount of dollars. Also, it will be observed that in the last coupon, here No. 11, in the right hand column there is an indication of a number of dollars, to wit $10,000, while in the left hand column there is no indication of any amount. Then by comparing the dollar indications on each coupon it will be seen that the left hand column indications of each coupon are the same in amount as the right hand column indications of each succeeding coupon. That is to say, the left hand column indication of coupon No. 1 is $1,000 and the right hand column indication of coupon No. 2 is $1,000; the left hand column indication of coupon No. 5 is $5,000 and the right hand column indication of coupon No. 6 is $5,000. It will thus be apparent that wherever in the intermediate section B the form is severed the largest amount shown on any coupon attached to the upper portion will correspond to the smallest amount shown on any coupon attached to the lower portion. When severed, the upper portion is to be delivered to the insured and the lower portion sent to the home office.

The third section of the form constitutes, in this case, an application for life insurance which is to be signed by the applicant who is the individual whose name appears at the top of the form and to whom the company agrees to issue a policy under certain conditions. This application, as in the upper right hand corner, bears the same certificate number as appears in the upper right hand corner of section A of the form and contains blanks to indicate the form of contract desired, the name of the beneficiary, the declaration of the payment of the premium to the agent whose name appears at the top of the form, and provisions for the signature of the applicant, witness, etc.

Briefly, the method of use of this form in the insurance business is as follows. The agent, Richard Rowe, having sold a policy of insurance to John Doe receives from the company one of these forms properly numbered and containing only the name of the insured, the name of the agent, and the signature of the proper company official. This constitutes an authorization of the agent to put in force a policy of insurance limited only in the maximum amount of the policy which is indicated by the largest amount shown on any coupon. If the insured desires more insurance, (it may be had without further medical examination, etc., if taken within the sixty days which is usually allowed in this business), he indicates to the agent the form of contract he desires, and the name of the beneficiary. These items are filled in both in the upper part of the form, section A, under the receipt and in the lower part of the form, section C, which constitutes the application, the agent then severs this form in the intermediate section B under the coupon which, in the left hand column, shows the amount of insurance which the insured desires to buy. If the policy is to be for $5,000, the form is severed below coupon No. 5. The upper portion is then delivered to the insured and represents all of the details of the proposed policy and the largest amount on any coupon indicates the amount for which the face of the policy is to be written. The lower part is returned to the company as its guide in preparing the complete policy, and other facts as to the policy, to wit the form of the contract and the beneficiary having been written into the application, the amount for which the policy is to be written will be found to be the smallest amount represented on any coupon attached.

I claim as my invention:—

1. In a life insurance form, a sheet comprising three sections, the upper of said sections comprising a certificate bearing a conditional offer to an insured, an authorization to an agent, a receipt, and an appropriately designated certificate date and signature line; the lower of said sections comprising an application for insurance as offered in said certificate section; said upper and lower sections bearing like provisions for limiting the time of acceptance of the offer of insurance, and identical serial numbers; and an intermediate section comprising a plurality of coupons with indicated lines of severance between them and indications of amounts of dollars on said coupons so arranged that when adjacent coupons are separated along the line of severance therebetween the amounts on said adjacent coupons automatically establish a check as to the amount of insurance agreed upon.

2. In a life insurance form, a sheet comprising three sections, the upper of said sections comprising a certificate bearing a conditional offer to an insured, an authorization to an agent, a receipt, and an appropriately designated certificate date and signature line; the lower of said sections comprising an application for insurance as offered in said certificate section; said upper and lower sections bearing like provisions for limiting the time of acceptance of the offer of insurance, and identical serial numbers; and an intermediate section comprising a plurality of coupons with indicated lines of severance between them and indications of amounts of dollars on said coupons, an amount on any given one of said coupons corresponding to an amount on the next preceding coupon and a second amount on said given coupon corresponding to a like amount on the next succeeding coupon.

JAMES L. HOWARD